United States Patent Office 2,771,472
Patented Nov. 20, 1956

2,771,472

EPOXYOCTADECYL ADIPATES

Arthur W. Ritter, Jr., Haddon Heights, N. J., and Stanley P. Rowland, Philadelphia, Pa., assignors to Rohm & Haas Company, Philadelphia, Pa., a corporation of Delaware No Drawing. Application August 30, 1954, Serial No. 453,119

5 Claims. (Cl. 260—348)

This invention relates to epoxyoctadecyl esters of adipic acid. It relates to epoxyoctadecyl adipates which contain epoxy groups,

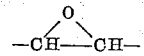

attached to each octadecyl moiety of the esters, and to mixtures of the epoxyoctadecyl adipates. It also relates to the use of these materials as plasticizers, particularly as plasticizers for those resins or plastics, such as vinyl halide resins or chlorinated rubbers which contain combined halogen and which are subject to degradation in the presence of light and heat.

The products of this invention are especially useful as plasticizers for halogen-containing resins and plastics, such as polyvinyl chloride, polyvinylidene chloride and chlorinated rubbers because they exert both an efficient plasticizing effect and an efficient stabilizing effect. Thus, they have a plasticizing action of about the same order as that of the widely used, simple, non-epoxy esters typified by dioctyl phthalate; and, in addition, they exert a very desirable stabilizing action. Their ability to stabilize is much like that of the well-known epoxidized vegetable oils while their plasticizing action is much greater than that of the latter.

The adipic esters of this invention are made by epoxidizing oleyl, linoleyl or linolenyl adipates or mixtures thereof. Oleyl adipate, with a single double bond in each of the oleyl moieties of the ester, gives rise to di(9,10-epoxyoctadecyl)adipate. Similarly, linoleyl and linolenyl adipates, having respectively two and three double bonds in the alcohol moieties of the esters, give rise respectively to di(diepoxyoctadecyl)adipate and di(triepoxyoctadecyl)adipate.

The oleyl, linoleyl and linolenyl alcohols, from which the corresponding adipic acid esters are prepared can be obtained in pure form. However, for the production of epoxy plasticizers—particularly on an economical, commercial scale—the commercial grades of these alcohols can be used. In fact, the so-called "oil alcohols," which are mixtures of alcohols obtained by reduction of esters of the fatty acids of vegetable oils by means of sodium and an alcohol such as ethanol or butanol, are particularly well suited for use in the production of diadipates which are then epoxidized. These oil alcohols include the mixtures of alcohols obtained by the sodium-alcohol reduction of the esterified fatty acids of such common oils as soybean, linseed, safflower, cottonseed and perilla oils. Such commercial grades of oil alcohols also contain various amounts of stearyl alcohol, i. e., octadecyl alcohol. The amount, however, of this last saturated alcohol which is present in vegetable oils is not sufficient to require its separation prior to the preparation of epoxy plasticizers of this invention. It is apparent that soybean alcohols contain largely oleyl alcohol, together with stearyl alcohol and linoleyl alcohol, and that linseed alcohols contain stearyl, oleyl, linoleyl, and linolenyl alcohols while other oil alcohols contain various mixtures of these compounds. And it follows that when such mixtures of unsaturated alcohols are used, mixed esters of adipic acid are also formed, such as oleyl, linolenyl adipate, linolenyl linoleyl adipate and oleyl linoleyl adipate. Such mixtures, when epoxidized, are excellent plasticizers and stabilizers for the halogen-containing resins and plastics.

Various methods of epoxidation may be employed to convert the unsaturated adipic esters to epoxyoctadecyl adipates. General methods of epoxidation by means of performic acid or peracetic acid have been disclosed heretofore, for example, in U. S. Patents 2,458,484; 2,485,160; 2,567,930, and 2,569,502 and in journal articles including a recent article with an extensive bibliography by Greenspan and Gall in Industrial & Engineering Chemistry, vol. 45, No. 12, pp. 2722–2726 of December, 1953. A preferred method is to epoxidize the unsaturated esters of adipic acid by means of peracetic acid or performic acid which is formed "in situ" in an aqueous solution which is in contact with the unsaturated adipate and which contains hydrogen peroxide, formic acid or acetic acid or acetic anhydride, and preferably an auxiliary acidic agent, such as a mineral acid, which has a catalytic effect on the rate of epoxidation.

In order that the epoxidized ester have the greatest possible stabilizing effect when it is employed in conjunction with halogen-containing resins or plastics, it is desirable that every double bond in every alcohol moiety of the adipic ester be epoxidized and thus converted to an oxirane or epoxy group,

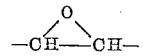

In commercial production, however, this ideal is not often realized particularly in the case of the linoleyl and linolenyl esters of adipic acid. Nor need it be for many applications of the products. It has been found, however, that in order for an ester to have adequate compatibility with halogen-containing plastics and to impart adequate stability to such compositions, it is important that the epoxidized adipic ester contain an average of at least 0.7 epoxy group for each alcohol moiety in the epoxidized adipic ester; i. e., at least 70 epoxy groups for every 100 alcohol moieties.

As indicated above, the products of this invention are currently most useful as plasticizers for resins and plastics. They can be used in conjunction with nitrocellulose but their most useful application is in conjunction with chlorinated rubber and halogen-containing vinyl resins because they stabilize as well as plasticize the halogen-containing plastics which are subject to degradation. The category of halogen-containing vinyl resins embraces the following: polymers of a vinyl halide, such as vinyl chloride and vinyl bromide; copolymers of a vinyl halide and a vinyl ester of a lower aliphatic acid, such as copolymers of vinyl chloride and vinyl acetate or vinyl propionate; copolymers of vinyl halides and vinylidene halides, such as copolymers of vinyl chloride and vinylidene chloride; and copolymers of a vinyl halide with other copolymerizable compound containing a vinylidene group, $CH_2=C<$, such as ethyl acrylate, methyl methacrylate, and the like.

The amount of the epoxidized ester of adipic acid which is normally employed in conjunction with the halogen-containing plastic material is determined by the degree of plasticization and stabilization which is required. As little as 2% of an epoxy adipate based on the weight of the plastic material exerts a stabilizing action but has little plasticizing effect. On the other hand, the presence of 25% or more exerts a real softening action together with increased stabilization. For the production of flexible sheeting, from about 40% to about 70% of the epoxy adipate, based on the weight of the plastic material, is recommended when the epoxy adipate is the sole plasticizer employed. The products of this invention may also be used in conjunction with other conventional modifiers for plastic materials such as pigments, dyes, extenders, fillers, release agents, mold lubricants, and other plasticizers.

The following examples serve to illustrate the production of the products of this invention.

Example 1

A. *Preparation of dioleyl adipate.*—A total of 73.1 grams (0.5 mole) of adipic acid and 429.5 grams (1.6 moles) of oleyl alcohol (commercial grade) were charged to a reactor equipped with thermometer, agitator and a reflux condenser fitted with a water separator. Then 0.18 gram of zinc chloride and 100 ml. of toluene were added and the reaction mixture was heated to refluxing temperature. Reaction was continued at refluxing temperature for a total of 20 hours, after which the reaction mixture was cooled and filtered. Volatile constituents were removed by distillation up to a pot temperature of 268° C./0.7 mm. The yield of dioleyl adipate was 318 grams. Its composition was confirmed by analysis. Its iodine number was 79.

B. *Epoxidation of dioleyl adipate.*—To a reactor, equipped with a thermometer, agitator and reflux condenser, was charged 112.8 grams (0.174 mole; 0.349 equivalent of double bonds) of the dioleyl adipate prepared above and 6.9 grams (0.135 mole) of a 90% aqueous solution of formic acid. While this mixture was stirred and maintained at 25°–35° C., there was slowly added, over a period of about 20 minutes, 31 grams (0.455 mole) of a 50% aqueous solution of hydrogen peroxide. Agitation at room temperature was continued for 24 hours, after which 100 ml. of toluene was added and the aqueous layer was removed. The organic layer was washed successively with 100 ml. of water, 100 ml. of a saturated sodium bicarbonate solution and 100 ml. of water. Thereafter the organic layer was freed of solvent by distillation to a pot temperature of 100° C./15 mm. The yield of dioleyl epoxystearate was 106 grams. The product was a white wax which had a saponification of 166, an acid number of 0.7 and an oxirane oxygen-content of 3.82%.

Example 2

A. *Preparation of adipic acid ester of the soybean alcohols.*—This ester was prepared by the process described above for the preparation of dioleyl adipate. Thus, 87.5 grams of adipic acid (0.6 mole) was esterified with 492 g. (1.8 moles) of the mixture of alcohols prepared by the sodium-alcohol reduction of the fatty acids of soybean oil. The soybean alcohols had a hydroxyl number of 207 and an iodine number of 143.4. Esterification was carried out for a total of 11 hours after which the reaction mixture was cooled, filtered and then distilled at a pot temperature up to 243° C./0.5 mm. for removal of the toluene and the excess of soybean alcohols. A yield of 394 grams of the adipic ester was obtained which had a saponification number of 164, (calculated value=170.5), an acid number of 2.4 and an iodine number of 120 (calculated value=119.5).

B. *Epoxidation of soybean alcohol adipate.*—The ester prepared in part A above was epoxidized by the process of part B of Example 1. Thus 152.5 grams (0.446 mole or 0.72 equivalents of double bond unsaturation) was epoxidized with 16.2 grams (0.316 mole) of a 90% aqueous solution of formic acid and 104 grams (1.08 moles) of a 35% solution of hydrogen peroxide. The epoxidized ester was obtained as a yellow solid having an acid number of 0.1, a saponification number of 158 (calculated value=153) and an oxirane oxygen-content of 5.9%.

Example 3

A. *Preparation of adipic ester of linseed alcohols.*—The process described above in Example 2 was used in the preparation of the adipic ester of the alcohols prepared by the sodium-alcohol reduction of lineseed oil fatty acids. Thus, 87.5 grams (0.6 mole) of adipic acid was reacted with 510 grams (1.8 moles) of the linseed alcohols which had an hydroxyl number of 198 and an iodine number of 183. Esterification was carried out for 10 hours and the product was worked up as described above. The ester had an acid number of 2.0, a saponification number of 162 (calculated value=166) and an iodine number of 155 (calculated value=153).

B. *Epoxidation of the adipic ester of linseed alcohols.*—A charge of 164 grams (0.472 mole; 1.0 equivalent of double bonds) of the adipic ester of linseed alcohol prepared above, 164 grams of carbon tetrachloride and 19.5 grams (0.382 mole) of a 90% aqueous solution of formic acid were charged to a reactor equipped with thermometer, agitator and reflux condenser. This mixture was stirred and maintained at 20°–30° C. while to it was added 88.5 grams (1.3 moles) of 50% hydrogen peroxide solution over a period of one hour. Agitation was then continued for 24 more hours at room temperature. At the end of this time, the aqueous phase was removed. The organic phase was washed and then stripped of solvent up to a pot temperature of 100° C./15 mm. A yield of 174 grams of the semi-solid, epoxidized ester was obtained which had an acid number of 1.46, a saponification number of 159 and an oxirane oxygen-content of 6.4%.

Example 4

The products of Examples 1 to 3 were all compatible with the halogen-containing plastic materials mentioned above. Their effect as plasticizers and stabilizers was compared with that of dioctyl phthalate, which is highly regarded in industry as a plasticizer for vinyl resins. The three epoxy adipates and the dioctyl phthalate (DOP) were individually blended with polyvinyl chloride in the following formulation, wherein all parts are by weight:

| | Parts |
|---|---|
| Polyvinyl chloride (Geon 101) | 60 |
| Plasticizer | 40 |
| Basic lead sulfate ("Tribase") | 1 |
| Stearic acid | 0.5 |

The ingredients were blended and then milled on a roller mill maintained at apporximately 163° C. Milling was continued for five minutes after the ingredients had fluxed. Sheets of the compositions were always conditioned at 25° C. and 50% relative humidity for at least 15 hours before any measurements of weight were made. The compositions were subjected to the following tests:

1. *Shore hardness.*—A Shore "A" durometer, under a weight of 3 pounds is applied to the test specimens. A recording is made at once and after 10 seconds; and the hardness is expressed by the two values, of which the first recording is the higher.

2. *Brittle-point temperature.*—Specimens are tested by the A. S. T. M. method D746–44T and the temperatures are recorded at which the specimens are brittle.

3. *Heat stability.*—Specimens of all compositions are heated simultaneously and the time is recorded, in hours, when the individual samples show the same definite discoloration.

4. *Soapy water extraction.*—Weighed specimens are immersed in a 1% aqueous solution of Ivory soap at 60° C. for 24 hours, after which they are thoroughly dried and re-weighed. The loss in weight, expressed as the percentage of the original weight, is a measure of the amount of plasticizer which has been extracted by the soap solution.

5. *Gasoline extraction.*—Weighed samples are immersed in white, lead-free gasoline at 25° C. for 60 minutes, after which they are thoroughly dried and re-weighed. The loss in weight, expressed as the percentage of the original weight, is a measure of the amount of plasticizer which has been extracted by the gasoline.

6. *Activated carbon volatility.*—Individual specimens are placed between 2" layers of activated carbon in sealed glass jars which are maintained at 90° C. for 24 hours. The specimens are removed, dusted free of carbon, and re-weighed. Here again, the loss in weight is a measure of the amount of plasticizer which has been removed by the carbon.

The results of the tests are here tabulated:

| Test | Prod. of Ex. 1 | Prod. of Ex. 2 | Prod. of Ex. 3 | DOP |
|---|---|---|---|---|
| Hardness | 77–71 | 78–71 | 76–69 | 73–65 |
| Bend-Brittle, 0° | −29 | −17 | −20 | −32 |
| Heat Stability, Hours | 5 | >5 | >5 | 1–1½ |
| Soapy Water Extr., percent loss | 7.8 | 8.5 | 10.6 | 2.1 |
| Gasoline Extr., percent loss | 28.6 | 16.3 | 9.0 | 26.1 |
| Activated Carbon Volatility, percent loss | 2.0 | 0.8 | 0.6 | 9.7 |

We claim:

1. As a new composition of matter, an epoxidized ester of (*a*) adipic acid and (*b*) at least one unsaturated alcohol from the class consisting of oleyl, linoleyl and linolenyl alcohols, said epoxidized ester containing an average of at least 70 epoxy groups for every hundred alcohol moieties in said ester.

2. Di(9,10-epoxyoctadecyl)adipate.

3. As a new composition of matter, a mixture of epoxidized esters of (*a*) adipic acid and (*b*) a mixture of unsaturated alcohols resulting from the sodium-alcohol reduction of esters of vegetable oil fatty acids, said epoxidized ester containing an average of at least 70 epoxy groups for every hundred alcohol moieties in said ester.

4. As a new compostion of matter, a mixture of epoxidized esters of (*a*) adipic acid and (*b*) a mixture of unsaturated alcohols resulting from the sodium-alcohol reduction of esters of soybean oil fatty acids, said epoxidized esters containing an average of at least 70 epoxy groups for every hundred alcohol moieties of said esters.

5. As a new composition of matter, a mixture of epoxidized esters of (*a*) adipic acid and (*b*) a mixture of unsaturated alcohols resulting from the sodium-alcohol reduction of esters of linseed oil fatty acids, said epoxidized esters containing an average of at least 70 epoxy groups for every hundred alcohol moieties of said esters.

References Cited in the file of this patent

UNITED STATES PATENTS

| | | |
|---|---|---|
| 2,464,137 | Levy et al. | Mar. 8, 1949 |
| 2,537,981 | Edwards | Jan. 16, 1951 |
| 2,541,492 | Anderson et al. | Feb. 13, 1951 |
| 2,669,549 | Darby | Feb. 16, 1954 |